(12) United States Patent
Kihira

(10) Patent No.: US 11,841,073 B2
(45) Date of Patent: Dec. 12, 2023

(54) SHAFT RETENTION MECHANISM AND SPEED REDUCER

(71) Applicant: Nabtesco Corporation, Tokyo (JP)

(72) Inventor: Masato Kihira, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 40 days.

(21) Appl. No.: 17/237,881

(22) Filed: Apr. 22, 2021

(65) Prior Publication Data

US 2021/0372516 A1    Dec. 2, 2021

(30) Foreign Application Priority Data

May 26, 2020  (JP) ................................ 2020-091150

(51) Int. Cl.
| | |
|---|---|
| *F16H 57/021* | (2012.01) |
| *F16H 57/04* | (2010.01) |
| *F16H 49/00* | (2006.01) |
| *F16H 57/02* | (2012.01) |

(52) U.S. Cl.
CPC ......... *F16H 57/021* (2013.01); *F16H 49/001* (2013.01); *F16H 57/045* (2013.01); *F16H 57/0471* (2013.01); *F16H 2057/02034* (2013.01); *F16H 2057/02073* (2013.01)

(58) Field of Classification Search
CPC .... F16H 57/021; F16H 49/001; F16H 57/045; F16H 57/0471; F16H 2057/02073; F16H 1/32; F16H 2001/323
See application file for complete search history.

(56) References Cited

U.S. PATENT DOCUMENTS

| | | | | |
|---|---|---|---|---|
| 8,777,574 | B2 * | 7/2014 | Asano | F03D 7/0224 |
| | | | | 416/155 |
| 9,435,399 | B2 * | 9/2016 | Akami | F16H 57/021 |
| 2006/0213303 | A1 * | 9/2006 | Shigemi | F16J 15/324 |
| | | | | 277/354 |
| 2011/0182735 | A1 * | 7/2011 | Kodama | F03D 7/0224 |
| | | | | 416/155 |

FOREIGN PATENT DOCUMENTS

| | | | | |
|---|---|---|---|---|
| EP | 2805077 B1 * | 4/2017 | ............ | F16C 19/185 |
| JP | 59-131641 U | 9/1984 | | |
| JP | 4351817 B | 10/2009 | | |

(Continued)

OTHER PUBLICATIONS

Machine translation of EP 2805077 B1, obtained from fit database (Year: 2017).*

(Continued)

*Primary Examiner* — Thomas C Diaz

(74) *Attorney, Agent, or Firm* — Pillsbury Winthrop Shaw Pittman, LLP

(57) ABSTRACT

A shaft retention mechanism of the present invention includes: a casing forming a housing space containing a lubricant; an input shaft penetrating a through-hole formed in the casing, the input shaft extending through the casing; a sealing ring encircling the input shaft in the through-hole, the sealing ring sealing between the input shaft and the casing; and a bearing disposed on an opposite side of the sealing ring to the housing space, the bearing rotatably supporting the input shaft in the through-hole.

7 Claims, 4 Drawing Sheets

(56) References Cited

FOREIGN PATENT DOCUMENTS

| JP | 4712654 B | 6/2011 | |
|---|---|---|---|
| JP | 2016-063599 A | 4/2016 | |
| JP | 6220206 B | 10/2017 | |
| JP | 2019-078342 A | 5/2019 | |
| KR | 200173419 Y1 * | 4/2000 | ............ F16J 15/164 |

OTHER PUBLICATIONS

Notification of Third Party Submission mailed Nov. 22, 2022, issued in corresponding Japanese Patent Application No. 2020-091150 with English translation (14 pgs.).

Notice of Reasons for Rejection dated Oct. 17, 2023, issued in corresponding Japanese Patent Application No. 2020-091150 with English translation (4 pgs.).

* cited by examiner

SHAFT RETENTION MECHANISM AND SPEED REDUCER

CROSS-REFERENCE TO RELATED APPLICATIONS

This application is based on and claims the benefit of priority from Japanese Patent Application Serial No. 2020-091150 (filed on May 26, 2020), the contents of which are hereby incorporated by reference in their entirety.

TECHNICAL FIELD

The present invention relates to a shaft retention mechanism and a speed reducer.

BACKGROUND

Rotational devices used in industrial robots or the like include a speed reducer for decelerating the drive torque of a motor. Such a speed reducer includes a casing and a plurality of gears housed in the casing (see, for example, Japanese Utility Model Application Publication No. Sho 59-131641). The casing has a through-hole penetrated by an input shaft of the motor. In the through-hole, a bearing is provided to support the input shaft rotatably.

The casing of the speed reducer contains a lubricant in a sealed manner. The lubricant serves to ensure lubrication between the gears and cool a sealing member. The lubricant is restrained from flowing out of the casing by the sealing member provided in the through-hole.

In the related art mentioned above, the sealing member is disposed on an outer side of the casing relative to the bearing, and thus only a small amount of the lubricant reaches the sealing member. Therefore, the sealing member may be heated due to, for example, the frictional heat produced between the sealing member and the input shaft.

SUMMARY

The present invention provides a shaft retention mechanism and a speed reducer in which the lubricant can be effectively delivered to the sealing member.

To overcome the above drawback, the present invention provides the following embodiments. A shaft retention mechanism according to one embodiment of the present invention comprises: a base portion forming a housing space containing a lubricant; a shaft penetrating a through-hole formed in the base portion, the shaft extending through the base portion; a sealing member encircling the shaft in the through-hole, the sealing member sealing between the shaft and the base portion; and a bearing disposed on an opposite side of the sealing member to the housing space, the bearing rotatably supporting the shaft in the through-hole.

According to this embodiment, it can be inhibited that the flow of the lubricant in the housing space is blocked by the bearing. Therefore, the lubricant can be effectively delivered to the sealing member. As a result, it can be inhibited that the sealing member is heated by the frictional heat or the like produced between the sealing member and the shaft. This arrangement inhibits, for example, thermal deformation of the sealing member, thereby maintaining the sealing performance for a long period.

In the above shaft retention mechanism, it is preferable that no sealing member is disposed on an opposite side of the bearing to the housing space.

In the above shaft retention mechanism, it is preferable that the shaft is capable of being removed from the base portion separately from the sealing member, and an inner diameter of the sealing member is smaller than an inner diameter of the bearing.

In the above shaft retention mechanism, it is preferable that the housing space contains a speed reducing mechanism connected to the shaft.

In the above shaft retention mechanism, it is preferable that a gear connected to the speed reducing mechanism is provided on an end portion of the shaft positioned on a housing space side of the sealing member, and an outer diameter of the gear is smaller than the inner diameter of the sealing member.

In the above shaft retention mechanism, it is preferable that a restraining member is removably provided on a portion of the base portion on an opposite side of the bearing to the sealing member, the restraining member restraining movement of the bearing in a direction away from the sealing member. A speed reducer according to one embodiment of the present invention comprises: a casing forming a housing space containing a lubricant; a speed reducing mechanism contained in the housing space; a shaft penetrating a through-hole formed in the casing, the shaft extending through the casing, the shaft being connected to the speed reducing mechanism in the casing; a sealing member encircling the shaft in the through-hole, the sealing member sealing between the shaft and the casing; and a bearing disposed on an opposite side of the sealing member to the housing space, the bearing rotatably supporting the shaft in the through-hole.

According to the above embodiments, the lubricant can be effectively delivered to the sealing member.

DESCRIPTION OF THE EMBODIMENTS

Figure 1:
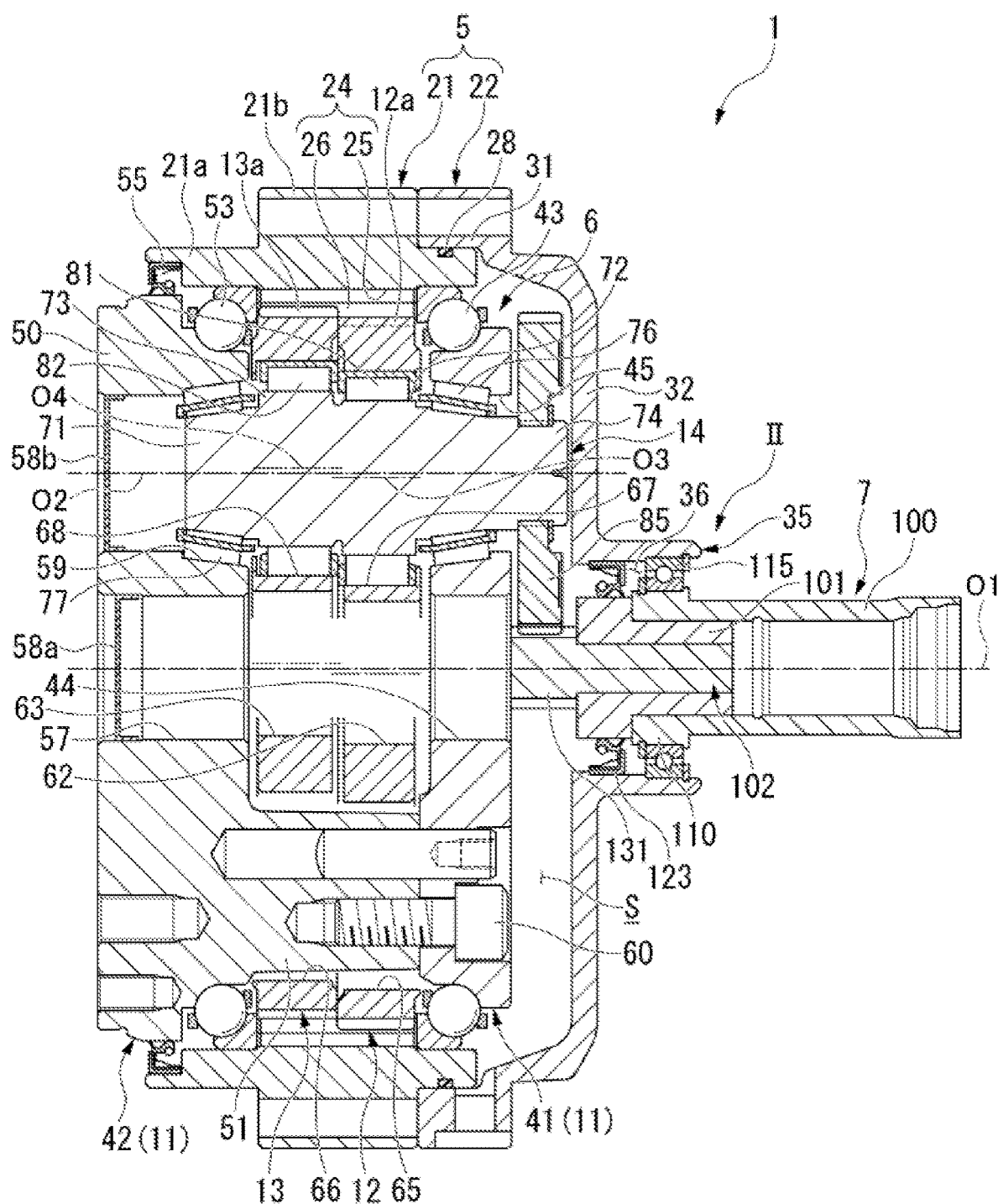
FIG. 1 is a sectional view of a speed reducer according to a first embodiment.

The embodiments of the present invention will be hereinafter described with reference to the drawings. In the following description of the embodiments and modifications, the corresponding elements will be denoted by the same reference numerals and may not be repeatedly described. In the following description, such terms as "parallel," "orthogonal," "center" and "coaxial" may appear to describe relative or absolute positions. These terms are not only strictly used but also allow some tolerances and relative differences in angle and distance as long as the same effects can be still produced.

First Embodiment

[Speed Reducer 1]

FIG. 1 is a sectional view of a speed reducer 1. As shown in FIG. 1, the speed reducer 1 is provided at a connection portion (joint portion) between a pair of arms that are rotatably connected in an industrial robot, for example. The speed reducer 1 decelerates the drive torque input from a motor (not shown). To the output side of the speed reducer 1, there is mounted a grip head or the like.

The speed reducer 1 includes a casing (base portion) 5, a speed reducing mechanism 6, and an input shaft 7.

<Casing 5>

The casing 5 forms a housing space S for housing the speed reducing mechanism 6. The casing 5 is formed by putting together a first casing 21 and a second casing 22, and the casing 5 as a whole has a bottomed tubular shape. In the following description, the axial direction extends along the axis O1 of the casing 5, and as viewed in the axial direction, the radial direction is orthogonal to the axis O1, and the circumferential direction encircles the axis O1.

The first casing 21 includes a tube portion 21a and a flange portion 21b. The tube portion 21a has inner teeth 24 on the inner peripheral surface thereof. The inner teeth 24 include a plurality of pin grooves 25 and inner tooth pins 26. The plurality of pin grooves 25 are formed in the inner peripheral surface of the tube portion 21a, and the inner tooth pins 26 are received in the pin grooves 25. The pin grooves 25 are open in the inner peripheral surface of the tube portion 21a and extend in the axial direction. The pin grooves 25 are arranged in the circumferential direction at the same pitch. Each of the inner tooth pins 26 is shaped like a column extending along the axial direction. The inner tooth pins 26 are received in the pin grooves 25 so as to partially protrude radially inward from the pin grooves 25. The inner tooth pins 26 are retained in the pin grooves 25 so as to be rotatable about respective axes parallel to the axis O1. The inner teeth 24 may be formed integrally with the tube portion 21a.

The flange portion 21b extends radially outward from the axially central portion of the tube portion 21a.

The second casing 22 closes the opening of the first casing 21 on a first side in the axial direction. The second casing 22 is shaped like a bottomed tube that is open toward a second side in the axial direction. The first casing 21 described above is assembled to the second casing 22 such that the tube portion 21a is fitted within the peripheral wall 31 of the second casing 22, and the flange portion 21b faces the peripheral wall 31 in the axial direction. A sealing member 28 is interposed between the outer peripheral surface of the tube portion 21a and the inner peripheral surface of the peripheral wall 31.

The bottom wall 32 of the second casing 22 extends radially inward from an end edge of the peripheral wall 31 on the first side in the axial direction. The bottom wall 32 has an annular shape. On the inner peripheral edge of the bottom wall 32, there is formed a support tube 35. The support tube 35 is coaxial with the axis O1 and extends toward the first side in the axial direction. The inside of the support tube 35 is a through-hole 36 that connects between the inside and the outside of the casing 5.

Figure 2:
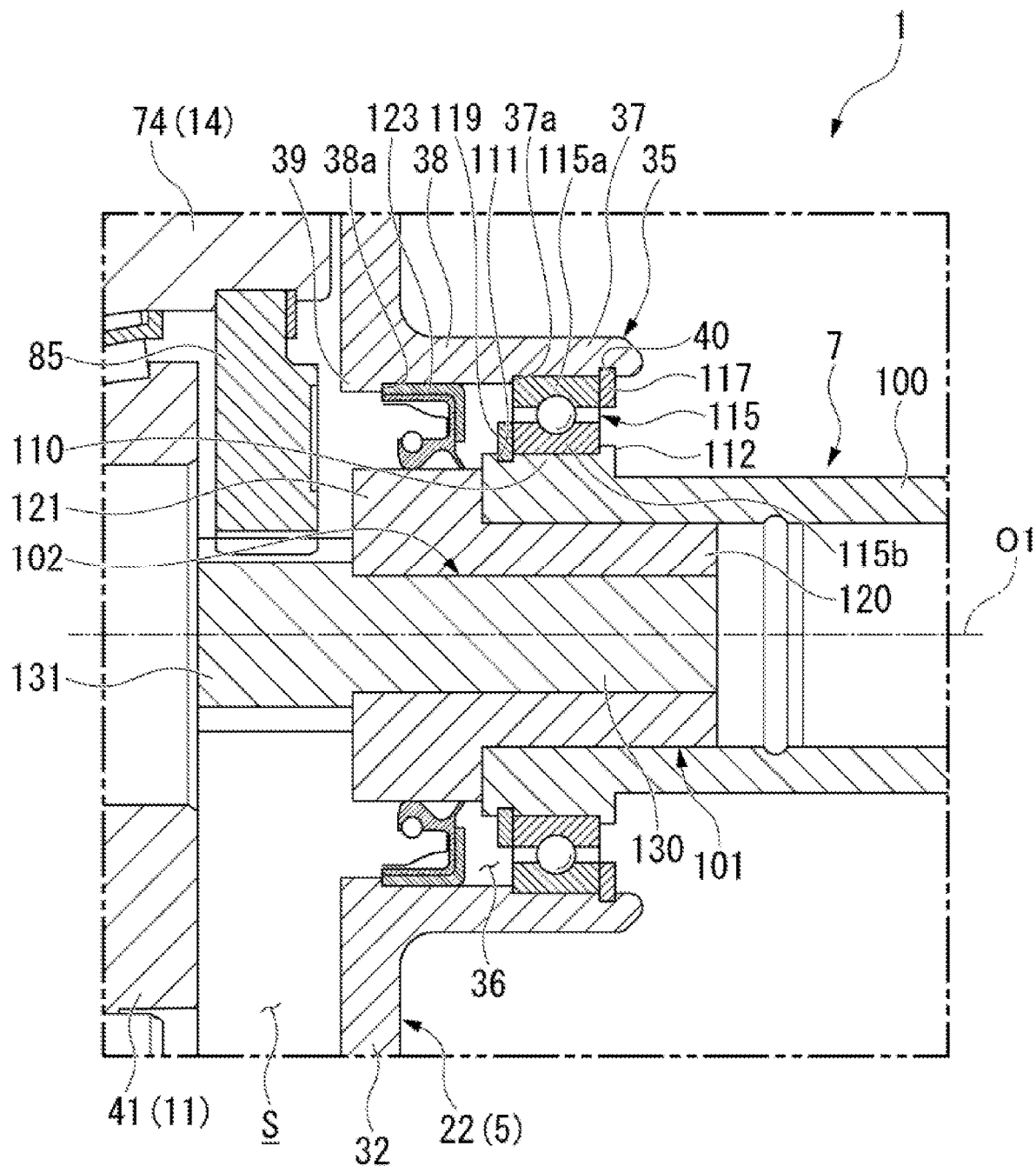
FIG. 2 is an enlarged view of the part II of FIG. 1.

FIG. 2 is an enlarged view of the part II of FIG. 1. As shown in FIG. 2, the inner diameter of the support tube 35 reduces stepwise from the first side toward the second side in the axial direction. Specifically, the support tube 35 includes a large diameter portion 37, an intermediate diameter portion 38, and a small diameter portion 39 connected together in the axial direction. The large diameter portion 37 has a groove formed therein. The groove 40 extends over the entire circumference of the inner peripheral surface of the large diameter portion 37. The large diameter portion 37 and the intermediate diameter portion 38 are connected by a first step surface 37a, and the intermediate diameter portion 38 and the small diameter portion 39 are connected by a second step surface 38a. Both the first step surface 37a and the second step surface 38a are flat surfaces orthogonal to the axial direction.

<Speed Reducing Mechanism 6>

As shown in FIG. 1, the speed reducing mechanism 6 includes a carrier 11, a plurality of oscillating gears (a first oscillating gear 12 and a second oscillating gear 13), and a plurality of crankshafts 14. The lubrication of the speed reducing mechanism 6 is maintained by a lubricant contained in the housing space S in a sealed manner.

The carrier 11 constitutes an output unit of the speed reducer 1. The carrier 11 is provided so as to be rotatable about the axis O1 inside the casing 5. The carrier 11 of this embodiment includes a first block 41 and a second block 42. The first block 41 is positioned on the first side (the right side in FIG. 1) in the axial direction within the casing 5. The first block 41 is shaped like a disc and is positioned coaxially with the axis O1. A bearing 43 is interposed between the outer peripheral surface of the first block 41 and the inner peripheral surface of the tube portion 21a. In this way, the first block 41 is supported on the casing 5 so as to be rotatable about the axis O1.

The first block 41 has a first through-hole 44 formed in the radially middle portion thereof. The first through-hole 44 extends through the first block 41 in the axial direction. In the periphery of the first block 41, there are formed a plurality of first shaft support holes 45. Each of the first shaft support holes 45 has a tapered portion with an inner diameter gradually smaller toward the first side in the axial direction. The first shaft support holes 45 are arranged at a distance from each other in the circumferential direction.

The second block 42 is positioned on the second side in the axial direction within the casing 5, relative to the first block. The second block 42 includes a base plate 50 and support columns 51. The base plate 50 is shaped like a disc and is positioned coaxially with the axis O1. The base plate 50 closes an opening of the first casing 21 (the tube portion 21a) positioned on the second side (the left side in FIG. 1) in the axial direction. A bearing 53 is interposed between the outer peripheral surface of the base plate 50 and the inner peripheral surface of the tube portion 21a. In this way, the second block 42 is supported on the casing 5 so as to be rotatable about the axis O1.

A sealing ring 55 is interposed between the outer peripheral surface of the base plate 50 and the inner peripheral surface of the tube portion 21a, and specifically, on the second side (the opposite side to the first block 41) of the bearing 53 in the axial direction. The sealing ring 55 encircles the base plate 50. The sealing ring 55 is in tight contact with the outer peripheral surface of the base plate 50 and the inner peripheral surface of the tube portion 21a. In this way, the sealing ring 55 blocks the connection between the inside and the outside of the casing 5 through the opening of the second casing 22. The sealing ring 55 is capable of sliding relative to at least one of the base plate 50 and the tube portion 21a (the base plate 50 for this embodiment) in accordance with the rotation of the base plate 50.

The base plate 50 has a second through-hole 57 formed in the radially middle portion thereof. The second through-hole 57 extends through the base plate 50 in the axial direction. The second through-hole 57 is sealed with a central cap 58a. In the periphery of the base plate 50, there are formed a plurality of second shaft support holes 59. Each of the second shaft support holes 59 has a tapered portion with an inner diameter gradually smaller toward the second side in the axial direction. The second shaft support holes 59 face the first shaft support holes 45 in the axial direction. Each of the second shaft support holes 59 is sealed with a peripheral cap 58b.

Each of the support columns 51 protrudes from a portion of the base plate 50 positioned between adjacent ones of the second shaft support holes 59 toward the first side in the axial direction. The support column 51 is opposed to the first block 41 in the axial direction and fixed thereto with a bolt 60 and the like. Therefore, the first block 41 and the second block 42 rotate integrally with the casing 5.

The first oscillating gear 12 and the second oscillating gear 13 are disposed inside the tube portion 21a so as to overlap with each other in the axial direction. The first oscillating gear 12 and the second oscillating gear 13 have an outer diameter slightly smaller than the inner diameter of the tube portion 21a. The first oscillating gear 12 has outer teeth 12a formed in the outer peripheral surface thereof. The second oscillating gear 13 has outer teeth 13a formed in the outer peripheral surface thereof. Both the outer teeth 12a of the first oscillating gear 12 and the outer teeth 13a of the second oscillating gear 13 are in mesh with the inner teeth 24 (inner tooth pins 26) described above. The respective numbers of the outer teeth 12a, 13a are slightly smaller than the number of the inner tooth pins 26 (the pin grooves 25) (by one, for example). A single oscillating gear may be provided.

The first oscillating gear 12 has a first central hole 62 formed in the central portion thereof. The second oscillating gear 13 has a second central hole 63 formed in the central portion thereof. The central holes 62, 63 have an inner diameter substantially the same as the inner diameter of the first through-hole 44.

The first oscillating gear 12 has a plurality of first relief holes 65 formed in the periphery thereof. The first relief holes 65 are arranged at a distance from each other in the circumferential direction. The second oscillating gear 13 has a plurality of second relief holes 66 formed in the periphery thereof. The second relief holes 66 are arranged in the circumferential direction at the same pitch as the first relief holes 65. Each of the relief holes 65, 66 is penetrated by a respective corresponding one of the plurality of support columns 51. The relief holes 65, 66 have an inner diameter larger than the outer diameter of the support columns 51. In this way, the operation of the oscillating gears 12, 13 are not prevented by the support columns 51.

In the periphery of the first oscillating gear 12, first passage holes 67 are formed between adjacent ones of the first relief holes 65. In the periphery of the second oscillating gear 12, second passage holes 68 are formed between adjacent ones of the second relief holes 66. Each of the passage holes 67, 68 are arranged at the same pitch as the shaft support holes 45, 59.

The crankshafts 14 serves as a power transmission unit between the carrier 11 and the oscillating gears 12, 13. The crankshafts 14 penetrate the corresponding shaft support holes 45, 59 and the corresponding passage holes 67, 68 so as to extend between the first block 41 and the base plate 50. Specifically, each of the crankshafts 14 includes a main shaft 71, a first eccentric portion 72, a second eccentric portion 73, and a protruding portion 74.

The main shaft 71 extends along an axis O2 that is parallel to the axis O1. The end portion of the main shaft 71 on the first side in the axial direction is supported via the bearing 76 so as to be rotatable in the first shaft support hole 45. The end portion of the main shaft 71 on the second side in the axial direction is supported via the bearing 77 so as to be rotatable in the second shaft support hole 59. The bearings 76, 77 may be, for example, angular bearings having cylindrical rollers as rolling elements.

The first eccentric portion 72 is formed at the portion of the main shaft 71 positioned in the first passage hole 67. The axis O3 of the first eccentric portion 72 is eccentric to the axis O2 of the main shaft 71. The first eccentric portion 72 is supported via an eccentric portion bearing 81 so as to be rotatable in the first passage hole 67. The second eccentric portion 73 is formed at the portion of the main shaft 71 positioned in the second passage hole 68. The axis O4 of the second eccentric portion 73 is eccentric to the axis O2 of the main shaft 71. The second eccentric portion 73 is supported via an eccentric portion bearing 82 so as to be rotatable in the second passage hole 68. The eccentric portions 72, 73 are out of phase around the axis O2 by 180°, for example.

The protruding portion 74 protrudes from the main shaft 71 toward the first side in the axial direction. A transmission gear 85 is mounted to the protruding portion 74.

<Input Shaft 7>

As shown in FIG. 2, the input shaft 7 rotates about the axis O1 in accordance with the rotation of the motor, thereby transmitting the drive torque of the motor to the speed reducing mechanism 6. The input shaft 7 includes an outer shaft 100, an inner shaft 101, and a gear shaft 102 that are assembled together.

The outer shaft 100 is a hollow circular shaft extending along the axis O1. In the outer shaft 100, the motor is connected on the first side in the axial direction. The end portion of the outer shaft 100 on the second side in the axial direction forms an enlarged portion 110 having a larger outer diameter than the middle portion of the outer shaft 100. A groove 111 is formed in the outer peripheral surface of the enlarged portion 110. The groove 111 extends over the entire circumference of the outer peripheral surface of the enlarged portion 110. A projection 112 that projects radially outward is formed on a portion of the enlarged portion 110 on the first side of the groove 111 in the axial direction. The projection 112 extends, for example, over the entire circumference of the enlarged portion 110.

The input shaft 7 is rotatably supported on the casing 5 via a bearing 115 interposed between the enlarged portion 110 and the support tube 35. The outer race 115a of the bearing 115 is inserted in the large diameter portion 37 of the support tube 35. The outer race 115a is retained between the first step surface 37a and a retaining ring (restraining member) 117 fitted in the groove 40. The retaining ring 117 is, for example, a C-ring, an E-ring, or any other ring with an annular shape having a part in the circumferential direction cut off. The retaining ring 117 is fitted in the groove 40 such that the inner periphery of the retaining ring 117 protrudes from the inner peripheral surface of the large diameter portion 37. The retaining ring 117 is elastically deformable and is capable of expansion and contraction in the axial direction. Therefore, the retaining ring 117 can be fitted into and removed from the groove 40, for example, using a tool for contracting the retaining ring 117 from its natural length.

The end surface of the outer race 115a on the second side in the axial direction abuts the first step surface 37a. The end surface of the outer race 115a on the first side in the axial direction abuts the retaining ring 117. In this way, the outer race 115a is restrained from moving in the axial direction relative to the casing 5 in the through-hole 57.

The inner race 115b of the bearing 115 is retained between the projection 112 of the enlarged portion 110 and a retaining ring 119 fitted in the groove 111. Specifically, the enlarged portion 110 is fitted inside the inner race 115b. The retaining ring 119 is fitted in the groove 111 such that the periphery of the retaining ring 119 protrudes from the outer peripheral surface of the enlarged portion 110. The end surface of the inner race 115b on the first side in the axial direction abuts the projection 112. The end surface of the inner race 115b on the second side in the axial direction abuts the retaining ring 119. In this way, the inner race 115b is restrained from moving in the axial direction relative to the input shaft 7.

The inner shaft 101 is a hollow circular shaft extending along the axis O1. Specifically, the inner shaft 101 includes a fixed portion 120 and a projecting portion 121 that is positioned on the second side of the fixed portion 120 in the axial direction and is continuous to the fixed portion 120. The fixed portion 120 is fixed in the outer shaft 100 by press-fitting or the like. Any method other than press-fitting (such as use of a key groove or D-cut) may also be used to fix the inner shaft 101 in the outer shaft 100 so as to be unrotatable relative to the outer shaft 100.

The projecting portion 121 protrudes from the outer shaft 100 toward the second side in the axial direction. The outer diameter of the projecting portion 121 is larger than the outer diameter of the fixed portion 120 and is smaller than the outer diameter of the enlarged portion 110. A sealing ring (sealing member) 123 is interposed between the projecting portion 121 and the intermediate diameter portion 38 of the support tube 35. The sealing ring 123 encircles the projecting portion 121. The inner diameter of the sealing ring 123 is smaller than the inner diameter of the bearing 115 (inner race 115b). The sealing ring 123 is in tight contact with the outer peripheral surface of the projecting portion 121 and the inner peripheral surface of the intermediate diameter portion 38. In this way, the sealing ring 123 blocks the connection between the inside and the outside of the casing 5, at a position in the through-hole 36 on the second side (the housing space S side) of the bearing 115 in the axial direction. In other words, the bearing 115 is positioned on the atmosphere side of the sealing ring 123. The sealing ring 123 is capable of sliding relative to at least one of the outer peripheral surface of the projecting portion 121 and the inner peripheral surface of the intermediate diameter portion 38 (the projecting portion 121 for this embodiment) in accordance with the rotation of the input shaft 7. The movement of the sealing ring 123 in the axial direction relative to the casing 5 is restricted between the second step surface 38a and the bearing 115.

The gear shaft 102 is a hollow circular shaft extending along the axis O1. The gear shaft 102 includes a fixed portion 130 and an input gear (a gear) 131 that is positioned on the second side of the fixed portion 130 in the axial direction and is continuous to the fixed portion 130. The fixed portion 130 is fixed in the inner shaft 101 by press-fitting or the like.

The input gear 131 protrudes from the inner shaft 101 toward the second side in the axial direction. The input gear 131 meshes with the transmission gear 85 in the casing 5. The maximum outer diameter of the input gear 131 is smaller than the inner diameter of the sealing ring 123. The shaft retention mechanism of this embodiment is constituted at least by the input shaft 7, the casing 5, the bearing 115, and the sealing ring 123.

As shown in FIG. 1, in the speed reducer 1 of this embodiment, the drive torque of the motor rotates the input shaft 7 and is thereby input to the speed reducing mechanism 6 via the transmission gear 85. When the crankshafts 14 rotate in one direction by the torque transmitted to the transmission gear 85, the eccentric portions 72, 73 of the crankshafts 14 rotate eccentrically about the axis O2. This causes the oscillating gears 12, 13 to rotate about the axis O1 while oscillating in the casing 5 in accordance with the rotation of the eccentric portions 72, 73. As a result, the outer teeth 12a, 13a of the oscillating gears 12, 13 move over the inner tooth pins 26 one by one as the oscillating gears 12, 13 rotate. The carrier 11 rotates about the first axis O1 in accordance with the rotation of the oscillating gears 12, 13. As a result, the rotation of the crankshafts 14 is decelerated and is output as the rotation of the carrier 11.

As described above, the casing 5 contains a lubricant in a sealed manner for lubrication of the speed reducing mechanism 6 and the like. The lubricant is moved in the casing 5 by the operation of the speed reducing mechanism 6 (for example, the rotation of the speed reducing mechanism 6 itself or the reduction of viscosity due to the heat produced in the speed reducing mechanism 6). In the embodiment, the housing space S is sealed by the sealing ring 55 interposed between the casing 5 and the second block 42 and the sealing ring 123 interposed between the casing 5 and the input shaft 7. This inhibits the lubricant from leaking out of the casing 5.

In particular, in the embodiment, the bearing 115, which is disposed in the through-hole 57 of the casing 5, is positioned on the opposite side (the atmosphere side) of the sealing ring 123 to the housing space S. With this arrangement, it can be inhibited that the flow of the lubricant in the casing 5 is blocked by the bearing 115. Therefore, the lubricant can be effectively delivered to the sealing ring 123. As a result, it can be inhibited that the sealing ring 123 is heated by the frictional heat or the like produced between the sealing ring 123 and the input shaft 7. This arrangement inhibits, for example, thermal deformation of the sealing ring 123, thereby maintaining the sealing performance for a long period.

In the embodiment, no sealing ring is disposed on the opposite side of the bearing 115 to the housing space S. With this arrangement, the lubricant can be effectively delivered to all of the sealing rings 55, 123 included in the speed reducer 1.

In a conventional arrangement in which a sealing member is disposed on an outer side of the casing relative to a bearing, supposing that an input shaft needs to be removed from the speed reducer, it is necessary to remove the sealing member prior to the removal of the input shaft. In this case, the casing may be damaged by a jig or the like inserted between the inner peripheral surface of the through-hole and the sealing member to remove the sealing member.

A description is given of a method of removing and mounting the input shaft 7 for the speed reducer 1 of the embodiment. First, the motor is removed, and then a tool or the like is inserted into the through-hole 57 from the first side in the axial direction. The retaining ring 117 is deformed by contraction to remove the retaining ring 117 from the casing 5. This permits the movement of the bearing 115 toward the first side in the axial direction relative to the casing 5.

Subsequently, the input shaft 7 is pulled out from the casing 5, and thus the input shaft 7 as a whole is removed from the casing 5 along with the bearing 115. In other words, the input shaft 7 is removed from the casing 5 separately from the sealing ring 123. This makes it possible to remove the retaining ring 119 for replacement of the bearing 115 and replacement of the sealing ring 123 in the through-hole 57.

To mount the input shaft 7 to the casing 5 again, the bearing 115 is first mounted to the input shaft 7. Specifically, the enlarged portion 110 is inserted inside the inner race 115b, and then the retaining ring 119 is mounted to the enlarged portion 110. Subsequently, the input shaft 7 is inserted into the through-hole 57 along with the bearing 115. At this time, the input shaft 7 is inserted until the outer race 115a abuts the first step surface 37a, such that the input gear 131 meshes with the transmission gear 85. The retaining ring 117 is then mounted in the through-hole 57. Mounting of the input shaft 7 is thus completed.

As described above, in this embodiment, the input shaft 7 can be mounted to and removed from the casing 5 separately from the sealing ring 123. With this arrangement, it is not necessary to remove the sealing ring 123 in removing the input shaft 7 from the casing 5. Therefore, it is less likely that a tool or the like contacts the inner peripheral surface of the through-hole 57. The casing 5 is thus inhibited from being damaged. Further, maintenance work is facilitated as compared to the case where attention is paid to contacts between the tool and the casing 5.

Further, in the embodiment, the inner diameter of the sealing ring 123 is smaller than the inner diameter of the bearing 115. Therefore, when the input shaft 7 is removed, it can be inhibited that the portion (the projecting portion 121 of the input shaft 7 that is in tight contact with the sealing ring 123 contacts with the bearing 115 or the casing 5.

In the embodiment, the speed reducing mechanism 6 is provided in the housing space S. As described above, this arrangement inhibits the lubricant from leaking out of the casing 5, and thus the lubrication of the speed reducing mechanism 6 can be maintained for a long period.

In the embodiment, the outer diameter of the input gear 131 is smaller than the inner diameter of the sealing ring 123. This arrangement inhibits the input gear 131 and the sealing ring 123 from contacting with each other when the input shaft 7 is removed. As a result, the maintenance work is further facilitated.

In the embodiment, the retaining ring 117 is removably provided on the casing 5 to restrain the movement of the bearing 115 in the direction away from the sealing ring 123 (toward the first side in the axial direction). With this arrangement, the input shaft 7 can be removed along with the bearing 115 by only removing the retaining ring 117 from the casing 5. This further facilitates the maintenance work.

In the first embodiment, the bearing 115 is removed together with the input shaft 7, but this arrangement is not limitative. In other words, the input shaft 7 may be removed independently of the bearing 115. In this case, the sizes of the bearing 115, the sealing ring 123, and the input gear 131 can be modified as necessary. It is also possible that the input shaft cannot be removed (the input shaft is configured not to be removed). In the embodiment described above, the bearing 115 is positioned on the atmosphere side of the sealing ring 123, but this arrangement is not limitative. The requirement in the speed reducer 1 is that the sealing ring 123 is positioned on the housing space S side of the bearing 115. In the embodiment described above, the input shaft 7 is divided into a plurality of members (the outer shaft 100, the inner shaft 101, and the gear shaft 102), but this arrangement is not limitative. The input shaft 7 may be an integrated member. In the embodiment described above, the bearing 115 is inserted in the through-hole 36, but this arrangement is not limitative. The bearing 115 may be fixed to the casing 5 by press-fitting or the like.

Second Embodiment

Figure 3:
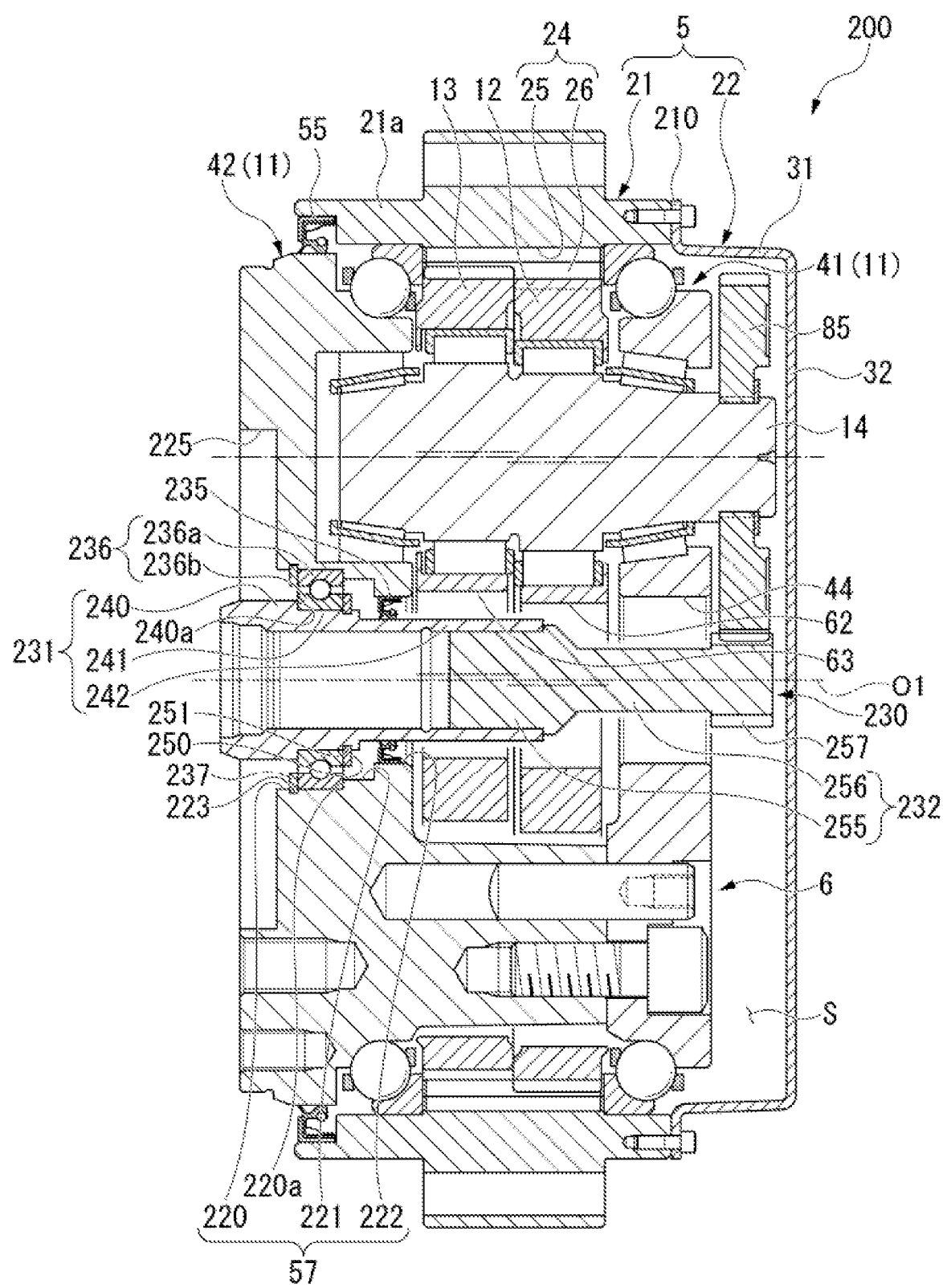
FIG. 3 is a sectional view of a speed reducer according to a second embodiment.

Next, a second embodiment of the present invention will now be described. FIG. 3 is a sectional view of a speed reducer 200 according to the second embodiment. This embodiment is different from the first embodiment described above in that the input shaft 230 extends through the speed reducing mechanism 6 in the axial direction. In the speed reducer 200 shown in FIG. 3, the second casing 22 is shaped like a bottomed tube that is open toward a second side in the axial direction. The second casing 22 has a flange portion 210 that projects radially outward from the peripheral wall 31. The flange portion 210 abuts the tube portion 21a of the first casing 21 in the axial direction and is fixed to the tube portion 21a.

The bottom wall 32 of the second casing 2 does not have the through-hole 36 of the first embodiment. Accordingly, the second casing 22 closes the entire opening of the first casing 21 on the first side in the axial direction.

In the embodiment, the inner diameter of the second through-hole 57 is smaller stepwise toward the first side in the axial direction. Specifically, the second through-hole 57 includes a large diameter portion 220, an intermediate diameter portion 221, and a small diameter portion 222. The large diameter portion 220 and the intermediate diameter portion 221 are continuous to each other via a step surface 220a. In the second block (base portion) 42, a recess 225 is formed around the second through-hole 57. The recess 225 has a larger inner diameter than the large diameter portion 220 and is open toward the second side in the axial direction. When the motor is connected to the speed reducer 200, a part of the housing of the motor is fitted into the recess 225. The second through-hole 57 described above is open in the bottom surface of the recess 225.

A sealing ring 235 is fitted in the small diameter portion 222 of the second through-hole 57. A bearing 236 is inserted in the large diameter portion 220. The outer race 236a of the bearing 236 is retained between the step surface 220a of the second through-hole 57 and a retaining ring 237 retained on the large diameter portion 220. In other words, the bearing 236 is positioned on the atmosphere side of the sealing ring 235. The retaining ring 237 is retained in a groove 223 formed in the inner peripheral surface of the large diameter portion 220. The inner diameter of the bearing 236 (the inner diameter of the inner race 236b) is larger than the inner diameter of the sealing ring 235 and is smaller than the inner diameter of the small diameter portion 222 of the second through-hole 57.

The input shaft 230 transmits the drive torque of the motor to the transmission gear 85. The input shaft 230 penetrates the second through-hole 57, the second central hole 63, the first central hole 62, and the first through-hole 44 and thus extends through the carrier 11 and the oscillating gears 12, 13. Specifically, the input shaft 230 is formed of a connecting shaft 231 and a gear shaft 232 that are assembled together in the axial direction.

The connecting shaft 231 is a hollow circular shaft extending along the axis O1. In the connecting shaft 231, the motor is connected on the second side in the axial direction. The outer diameter of the connecting shaft 231 is smaller stepwise toward the first side in the axial direction. Specifically, the connecting shaft 231 includes a large diameter portion 240, an intermediate diameter portion 241, and a small diameter portion 242. The large diameter portion 240 and the intermediate diameter portion 241 are continuous to each other via a step surface 240a. The outer diameter of the large diameter portion 240 of the connecting shaft 231 is smaller than the inner diameter of the intermediate diameter portion 221 of the second through-hole 57 and is larger than the inner diameter of the sealing ring 235. The outer diameter of the small diameter portion 242 of the connecting shaft 231 is sufficiently smaller than the inner diameters of the central holes 62, 63 of the oscillating gears 12, 13. This arrangement inhibits interference between the oscillating gears 12, 13 and the input shaft 230.

The connecting shaft 231 is inserted into the second through-hole 57 from the second side in the axial direction. In this state, the small diameter portion 242 extends through the sealing ring 235 to the central holes 62, 63. The outer peripheral surface of the small diameter portion 242 is in tight contact with the sealing ring 235. This arrangement blocks the connection between the inside and the outside of the casing 5 through the second through-hole 57. The intermediate diameter portion 221 is inserted in the bearing 236 (the inner race 236b). The bearing 236 is retained between the step surface 240a of the connecting shaft 231 and a retaining ring 250 retained in the intermediate diameter portion 241. The retaining ring 250 is retained in a groove 251 formed in the intermediate diameter portion 241.

The gear shaft 232 includes a fixed portion 255, an extension portion 256, and an input gear 257. The fixed portion 255 is fixed in the small diameter portion 242 of the connecting shaft 231 by press-fitting or the like. The extension portion 256 extends through the first central hole 62 of the first oscillating gear 12 and the first through-hole 41a of the first block 41. The input gear 257 protrudes from the extension portion 256 toward the first side in the axial direction. The input gear 257 meshes with the transmission gear 85 in the casing 5. The maximum outer diameter of the input gear 257 is smaller than the inner diameter of the sealing ring 235.

In the embodiment, to remove the input shaft 230, the retaining ring 237 is first removed from the second through-hole 57, and then the input shaft 230 is pulled out. In this way, the input shaft 230 is removed from the speed reducer 1 along with the bearing 236. This embodiment can produce the same advantageous effects as the first embodiment.

Third Embodiment

Figure 4:
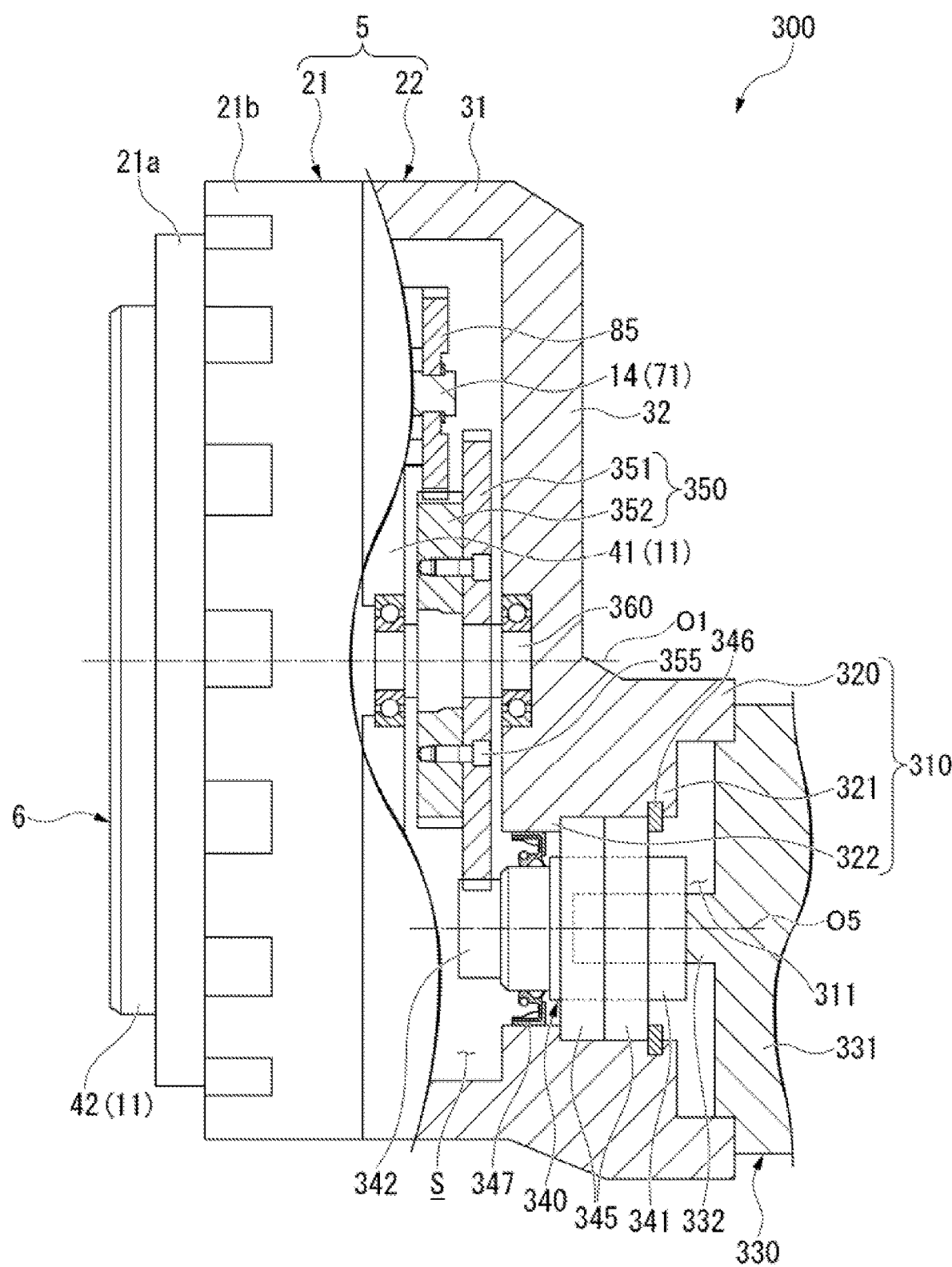
FIG. 4 is a partially sectional view of a speed reducer according to a third embodiment.

Next, a third embodiment of the present invention will now be described. FIG. 4 is a sectional view of a speed reducer 300 according to the third embodiment. This embodiment is different from the foregoing embodiments in that the input shaft 340 is positioned parallel to (offset from) the axis O1. In the speed reducer 300 shown in FIG. 4, a support tube 310 is formed on the bottom wall 32 of the second casing 22. The support tube 310 protrudes from the periphery of the bottom wall 32 toward the first side in the axial direction. The axis O5 of the support tube 310 is parallel to the axis O1. The inside of the support tube 310 is a through-hole 311 that connects between the inside and the outside of the casing 5.

The inner diameter of the support tube 310 is larger stepwise toward the first side in the axial direction. Specifically, the support tube 310 includes a large diameter portion 320, an intermediate diameter portion 321, and a small diameter portion 322 connected together in the axial direction. When the motor 330 is connected to the speed reducer 300, a part of the housing 331 of the motor 330 is fitted into the large diameter portion 320. The output shaft 332 of the motor 330 extends through the large diameter portion 320 to the intermediate diameter portion 321.

The input shaft 340 includes a connecting portion 341 and an input gear 342. The connecting portion 341 is connected with the output shaft 332, and the input gear 342 protrudes from the connecting portion 341 toward the second side in the axial direction. A bearing 345 is interposed between the end portion of the connecting portion 341 on the first side in the axial direction and the intermediate diameter portion 321. In this way, the input shaft 340 is rotatably supported on the casing 5 via the bearing 345. The bearing 345 is positioned in the axial direction between a retaining ring 346 removably mounted to the inner peripheral surface of the intermediate diameter portion 321 and the interface between the intermediate diameter portion 321 and the small diameter portion 322.

A sealing ring 347 is interposed between the end portion of the connecting portion 341 on the second side in the axial direction (on the housing space S side of the bearing 345) and the small diameter portion 322. The sealing ring 347 is in tight contact with the outer peripheral surface of the connecting portion 341 and the inner peripheral surface of the small diameter portion 322, so as to block the connection between the inside and the outside of the casing 5 through the through-hole 311.

The speed reducing mechanism 6 of this embodiment includes an intermediate gear 350 that connects between the transmission gear 85 and the input gear 342. The intermediate gear 350 is positioned between the bottom wall 32 and the first block 41 in the second casing 22. The intermediate gear 350 is a two-stage gear including a first gear 351 and a second gear 352. The first gear 351 and the second gear 352 are positioned coaxially with the axis O1 and are fixed together with a screw 355 or the like. The intermediate gear 350 is fixed to a support shaft 360. The support shaft 360 extends coaxially with the axis O1 and extends through the intermediate gear 350 in the axial direction. The support shaft 360 is rotatably supported on the first block 41 and the bottom wall 32.

The outer diameter of the first gear 351 is larger than that of the second gear 352. The first gear 351 meshes with the input gear 342 of the input shaft 340. The second gear 352 meshes with the transmission gear 85.

This embodiment can also produce the same effects as the above-described embodiments.

Other Modifications

The preferred embodiments described above do not limit the present invention. The embodiments can be modified by adding, omitting and replacing some or all of the features without departing from the scope of the invention. The present invention is not limited by the above description but only by the appended claims. In the embodiments described above, the shaft of the shaft retention mechanism is the input shaft 7 that transmits the drive torque of the motor to, for example, the speed reducing mechanism 6, but this example is not limitative. The shaft of the shaft retention mechanism may be connected to a member other than the speed reducing mechanism 6. In the embodiment described above, the shaft of the shaft retention mechanism is an input shaft, but this is not limitative. The shaft of the shaft retention mechanism may be an output shaft.

The features described throughout this disclosure may be adequately replaced by known features or elements without departing from the spirit of the present invention, and the above-described modification examples may be appropriately combined.

What is claimed is:
1. A shaft retention mechanism comprising:
  a base portion forming a housing space containing a lubricant;
  a shaft penetrating a through-hole formed in the base portion, the shaft extending through the base portion;

a sealing member encircling the shaft in the through-hole, the sealing member sealing between the shaft and the base portion; and a bearing disposed on an opposite side of the sealing member to the housing space, the bearing rotatably supporting the shaft in the through-hole, wherein the sealing member includes a first annular portion contacting an inner peripheral surface of the through-hole and extending in an axial direction, a second annular portion extending inward in a radial direction from the first annular portion, and a third annular portion connected to the second annular portion and contacting an outer peripheral surface of the shaft, wherein the inner peripheral surface of the through-hole is provided with a step surface that an end on an opposite side of the first annular portion to the bearing contacts, wherein a width of the step surface in the radial direction is less than a thickness of the first annular portion in the radial direction, wherein the shaft includes an outer shaft rotatably supported by the bearing, and an inner shaft, which are assembled together, wherein the inner shaft includes a fixed portion fixed in the outer shaft, and a projecting portion positioned on the housing space side of the fixed portion and in which an outer peripheral surface thereof is in contact with the third annular portion of the sealing member, and wherein an outer diameter of the projecting portion is less than that of a portion of the outer shaft, the portion of the outer shaft being supported by the bearing.

2. The shaft retention mechanism of claim 1, wherein no sealing member is disposed on an opposite side of the bearing to the housing space.

3. The shaft retention mechanism of claim 1, wherein the shaft is capable of being removed from the base portion separately from the sealing member, and wherein an inner diameter of the sealing member is smaller than an inner diameter of the bearing.

4. The shaft retention mechanism of claim 3, wherein the housing space contains a speed reducing mechanism connected to the shaft.

5. The shaft retention mechanism of claim 4, wherein a gear connected to the speed reducing mechanism is provided on an end portion of the shaft positioned on a housing space side of the sealing member, and wherein an outer diameter of the gear is smaller than the inner diameter of the sealing member.

6. The shaft retention mechanism of claim 3, wherein a restraining member is removably provided on a portion of the base portion on an opposite side of the bearing to the sealing member, the restraining member restraining movement of the bearing in a direction away from the sealing member.

7. A speed reducer comprising:

a casing forming a housing space containing a lubricant;

a speed reducing mechanism contained in the housing space;

a shaft penetrating a through-hole formed in the casing, the shaft extending through the casing, the shaft being connected to the speed reducing mechanism in the casing;

a sealing member encircling the shaft in the through-hole, the sealing member sealing between the shaft and the casing; and a bearing disposed on an opposite side of the sealing member to the housing space, the bearing rotatably supporting the shaft in the through-hole, wherein the sealing member includes a first annular portion contacting an inner peripheral surface of the through-hole and extending in an axial direction, a second annular portion extending inward in a radial direction from the first annular portion, and a third annular portion connected to the second annular portion and contacting an outer peripheral surface of the shaft, wherein the inner peripheral surface of the through-hole is provided with a step surface that an end on an opposite side of the first annular portion to the bearing contacts, wherein a width of the step surface in the radial direction is less than a thickness of the first annular portion in the radial direction, wherein the shaft includes an outer shaft rotatably supported by the bearing, and an inner shaft, which are assembled together, wherein the inner shaft includes a fixed portion fixed in the outer shaft, and a projecting portion positioned on the housing space side of the fixed portion and in which an outer peripheral surface thereof is in contact with the third annular portion of the sealing portion, and wherein an outer diameter of the projecting portion is less than that of a portion of the outer shaft, the portion of the outer shaft being supported by the bearing.

* * * * *